Figure 1:
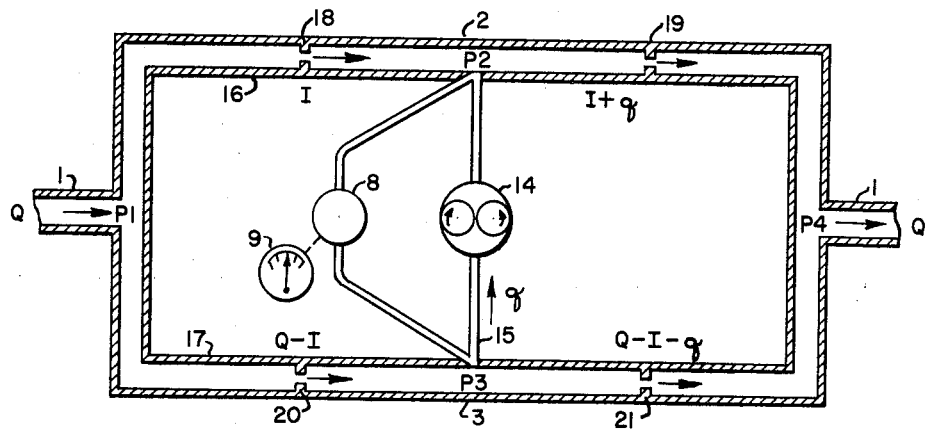

INVENTOR.
BERNARD FISHMAN
FREDERICK RYDER
BY

United States Patent Office 3,232,104
Patented Feb. 1, 1966

3,232,104
MASS FLOWMETER
Bernard Fishman, New York, and Frederick Ryder, Lynbrook, N.Y., assignors, by mesne assignments, to Flotron Inc., a corporation of New Jersey
Filed June 24, 1963, Ser. No. 289,970
10 Claims. (Cl. 73—205)

This application is a continuation in part of a patent application filed July 24, 1961, Serial No. 126,224 in the names of Bernard Fishman and Frederick Ryder, now abandoned.

This invention relates to apparatus adapted to measure rate of flow of fluids and more particularly relates to flowmeters adapted to measure mass flow rate in a linear manner.

Flowmeters adapted to measure the rate of flow through a conduit can usually be classified into one of three types, namely, volumetric, differential pressure, and mass-rate.

In the volumetric flowmeter the flow of liquid causes a propeller or turbine to revolve with an angular velocity proportional to the volume of fluid passing through it. In other embodiments the flow causes rotation of a nutating disc, rotation of an oscillating piston, or reciprocation of plungers. Such volumetric flowmeters requires a converter to give actual flow rate. In order to read out mass flow rate, it is necessary that a signal proportional to the density of the fluid be combined with the flowmeter readings.

Differential pressure flowmeters measure flow rate by sensing the differential pressure across a flow restrictor such as an orifice or in a venturi, flow nozzle, Pitot tube, or other such device. The velocity head or kinetic energy due to the fluid velocity is measured in this type of meter. Since there is a known-relationship between velocity head and fluid velocity for each specific meter, the fluid velocity can be determined by the following formula:

$$V = C\sqrt{\frac{2g\Delta P}{S}} = C\sqrt{\frac{2\Delta P}{\rho}}$$

where:
$V$ = velocity of fluid
$C$ = metering element coefficient
$g$ = gravity constant
$\Delta P$ = differential pressure
$S$ = specific weight of fluid
$\rho$ = density of fluid = $S/g$ Also, the mass flow rate can be expressed as follows:

$$M = \rho A V = CA\sqrt{2\rho\Delta P}$$

where:
$M$ = mass flow rate
$A$ = metering element flow area

Therefore, using known differential pressure flowmeters to obtain mass flow rate measurements also requires measurement of density and extraction of the square root of the read-out. Further, the differential pressure output signal by itself has a non-linear relationship to the flow rate and cannot be related to either the mass or volumetric flow rate except by including a fluid density factor.

Both the volumetric and differential pressure flowmeters have the additional fault that they will not accurately measure flow rate when the flow is pulsating or during transients. In the measurement of pulsating or transient flows, the accuracy of the volumetric type flowmeter is limited by the poor response characteristics of the known sensing elements. The differential pressure type flowmeter will introduce errors in measuring transient or pulsating flows due to the non-linear flow to read-out relationship.

There are two basic types of mass rate flowmeters, namely, angular momentum and recirculating type meters. In the former, angular momentum is imparted to the flowing fluid by means of a constant speed driving motor and the read-out signal is obtained as a torque. This type of mass rate flowmeter is expensive and tends to require a great deal of maintenance.

In the recirculation type of mass rate flowmeter, recirculation pumps or other such devices are used to obtain a recirculation of a constant volumetric flow in the meter. The meter is essentially a differential pressure type meter in which a constant volumetric flow is added or subtracted from the fluid flow being measured. The subject invention is an improved flowmeter of this type.

It is an object of this invention to provide a flowmeter which uses a single differential pressure indicator or transducer to obtain a linear indication of mass flow rate of fluids having different densities.

It is another object of this invention to provide such a flowmeter which accurately measures transient or pulsating flow as well as steady flow.

It is another object of this invention to provide such a flowmeter which is inexpensive, simply constructed and requires a minimum of maintenance.

Figure 2:
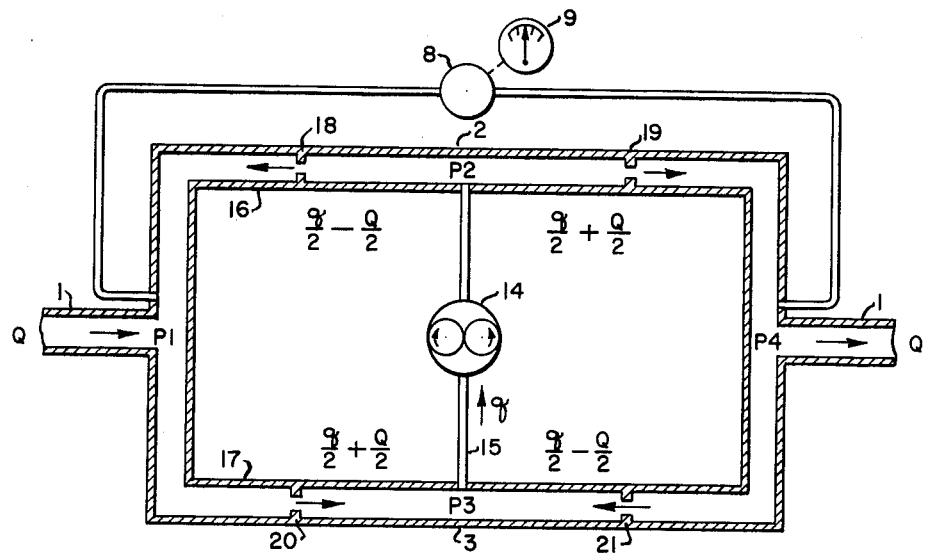

Other objects and a fuller understanding of the invention may be had by referring to the following description and claims taken in conjunction with the accompanying drawings in which:

FIGURE 1, is a schematic drawing of a flowmeter utilizing four flow restrictors, one pump and one differential pressure indicator or transducer; and FIGURE 2, is a schematic drawing of another embodiment of a flowmeter utilizing four flow restrictors, one pump and one differential pressure indicator or transducer.

FIGURES 1 and 2 illustrate diagrammatically two embodiments of the present invention which utilize a single pump 14 to provide a linear read-out by means of a differential pressure sensor 8 such as the well-known Bourdon tube, diaphragm or bellows type cooperating with the meter 9 of the mass flow rate through the conduit 1. The pump 14 provides a constant volumetric recirculating flow "$q$" which can be either smaller or greater than the input volumetric flow "$Q$" to be measured. In the embodiment shown in FIGURE 1, where "$q$" is smaller than "$Q$," the input volumetric flow "$Q$" is divided into two flows "$I$" and "$Q-I$" by two like branch conduits 16 and 17. Intermediate the ends of these branch conduits 16 and 17, they are interconnected by a conduit 15 which has pump 14 disposed intermediate the ends thereof. In this embodiment there are four flow restrictors 18, 19, 20, 21, with two of these restrictors disposed in each branch conduit along the path of flow therein and on opposing sides of the points where conduit 15 interconnects these branch conduits 16 and 17. The single differential pressure indicator or transducer is connected to the two sections 2 and 3 adjacent the points of joinder of conduit 15 with the branch conduits 16 and 17.

As stated the input flow "$Q$" is divided into two flows "$I$" and "$Q-I$" with "$I$" passing through flow restrictor 18 in branch conduit 16 and with "$Q-I$" passing through flow restrictor 20 in branch conduit 17. When the flow "$Q-I$" reaches connecting conduit 15, pump 14 causes a constant volumetric flow "$q$" to be withdrawn from conduit 17 and to be added to conduit 16. This causes the flow through flow restrictor 19 in conduit 16 to be "$I+Q$" and the flow through restrictor 21 in conduit 17 to be "$Q-I-q$." If the pressures upstream and downstream of the four flow restrictors 18, 19, 20 and 21 are designated $P_1$, $P_2$, $P_3$, and $P_4$, as shown in FIGURE 1, the flow versus pressure drop relationships for the four flow restrictors can be derived as shown below. In accordance with well-known practices, the cross-sectional areas of the conduits are large, resulting in relatively low liquid velocities, such that mixing losses and pressure inconsistencies between orifices or flow restrictors 18 and 19 and between 20 and 21 are not significant.

The equation for the flow through a flow restrictor is as follows:

(1) $$Q = CA\sqrt{\frac{2g\Delta P}{S}} = CA\sqrt{\frac{2}{\rho}}\sqrt{\Delta P}$$

$Q$ = volumetric flow rate where:
$C$ = flow restrictor coefficient
$A$ = flow area of restrictor
$g$ = gravity constant
$\Delta P$ = differential pressure
$S$ = specific weight of fluid
$\rho$ = density = $S/g$ If we assume the same values of C and A for all four flow restrictors the flow equation for each flow restrictor can be expressed as follows:

(2) $$I = CA\sqrt{\frac{2}{\rho}}\sqrt{P_1 - P_2}$$

(3) $$Q - I = CA\sqrt{\frac{2}{\rho}}\sqrt{P_1 - P_3}$$

(4) $$I + q = CA\sqrt{\frac{2}{\rho}}\sqrt{P_2 - P_4}$$

(5) $$Q - I - q = CA\sqrt{\frac{2}{\rho}}\sqrt{P_3 - P_4}$$

By squaring each of the above four equations, we obtain the following:

(6) $$I^2 = \frac{2C^2A^2}{\rho}(P_1 - P_2)$$

(7) $$Q^2 - 2IQ + I^2 = \frac{2C^2A^2}{\rho}(P_1 - P_3)$$

(8) $$I^2 + 2Iq + q^2 = \frac{2C^2A^2}{\rho}(P_2 - P_4)$$

(9) $$Q^2 - 2IQ + 2Iq - 2Qq + I^2 + q^2 = \frac{2C^2A^2}{\rho}(P_3 - P_4)$$

By adding Equations 6 and 8 and by adding Equations 7 and 9, we obtain the following:

(10) $$2I^2 + 2Iq + q^2 = \frac{2C^2A^2}{\rho}(P_1 - P_4)$$

(11)
$$2Q^2 - 4IQ + 2I^2 + 2Iq - 2Qq + q^2 = \frac{2C^2A^2}{\rho}(P_1 - P_4)$$

By equating 10 and 11 we obtain the following:

(12) $$2I^2 + 2Iq + q^2 = 2Q^2 - 4IQ + 2I^2 + 2Iq - 2Qq + q^2$$

Equation 12 can be simplified to the following:

(13) $$I = \frac{Q}{2} - \frac{q}{2}$$

Therefore:

(14) $$Q - I = \frac{Q}{2} + \frac{q}{2}$$

(15) $$I + q = \frac{Q}{2} + \frac{q}{2}$$

(16) $$Q - I - q = \frac{Q}{2} - \frac{q}{2}$$

The above four Equations 13 through 16 indicate that the volumetric flow through restrictors 18 and 21 will be one-half the difference between the measured and recirculating volumetric flow and that the volumetric flow through restrictors 19 and 20 will be one-half the sum of the measured and recirculating volumetric flows.

Equations 2 and 3 can, therefore, be expressed as follows:

(17) $$\frac{Q}{2} - \frac{q}{2} = CA\sqrt{\frac{2}{\rho}}\sqrt{P_1 - P_2}$$

(18) $$\frac{Q}{2} + \frac{q}{2} = CA\sqrt{\frac{2}{\rho}}\sqrt{P_1 - P_3}$$

By squaring Equations 17 and 18 we obtain the following:

(19) $$\frac{Q^2 - 2qQ + q^2}{4} = \frac{2C^2A^2}{\rho}(P_1 - P_2)$$

(20) $$\frac{Q^2 + 2qQ + q^2}{4} = \frac{2C^2A^2}{\rho}(P_1 - P_3)$$

By subtracting 19 from 20 we obtain the following:

$$qQ = \frac{2C^2A^2}{\rho}(P_2 - P_3)$$

Therefore:

(21) $$P_2 - P_3 = \rho Q\left(\frac{q}{2C^2A^2}\right)$$

If $\Delta P_{2'3} = P_2 - P_3$ = measured differential pressure and $M = \rho Q$ = mass flow rate being measured

(22) $$\Delta P_{2'3} = M\left(\frac{q}{2C^2A^2}\right)$$

Since $q$, C, and A are constants, we can make $$K = \frac{q}{2C^2A^2}$$

Therefore:

(23) $$\Delta P_{2'3} = KM$$

The above derivation has been carried out for the condition where "$q$" is smaller than "$Q$." If, however, "$q$" is greater than "$Q$," by using the same type of derivation as for FIGURE 1, it can be shown that the direction of flow and volumetric flow rates through the four restrictors will be as shown in FIGURE 2.

The flow versus pressure drop relationships for restrictors 18 and 19 in FIGURE 2 can therefore be expressed as follows:

(24) $$\frac{q}{2} - \frac{Q}{2} = CA\sqrt{\frac{2}{\rho}}\sqrt{P_2 - P_1}$$

(25) $$\frac{q}{2} + \frac{Q}{2} = CA\sqrt{\frac{2}{\rho}}\sqrt{P_2 - P_4}$$

By squaring Equations 24 and 25, we obtain the following:

(26) $$\frac{q^2 - 2qQ + Q^2}{4} = \frac{2C^2A^2}{\rho}(P_2 - P_1)$$

(27) $$\frac{q^2 + 2qQ^2 + Q^2}{4} = \frac{2C^2A^2}{\rho}(P_2 - P_4)$$

By subtracting 26 from 27 we obtain the following

(28) $$qQ = \frac{2C^2A^2}{\rho}(P_1 - P_4)$$

Therefore:

(29) $$P_1 - P_4 = \rho Q\left(\frac{q}{2C^2A^2}\right)$$

If $\Delta P_{1'4} = P_1 - P_4$ = measured differential pressure and $M = \rho Q$ = mass flow rate being measured then $\Delta P_{1'4} = KM$.

A comparison of the flow distribution patterns of FIGS. 1 and 2 indicate that for the condition $q=Q$, the mass flow rate can be measured by measuring the differential pressures $\Delta P_2'_3$ or $\Delta P_1'_4$ since they are the same only for this condition. For the condition $q$ is less than Q, $\Delta P_1'_4$ would vary non-linearly with mass flow. Similarly for the condition q is larger than Q, $\Delta P_2'_3$ would vary non-linearly with mass flow.

Although we have described our invention with a certain degree of particularity, it is understood that the present disclosure has been made only by way of example and that numerous changes in the details of construction and the combination and arrangements of parts may be resorted to without departing from the spirit and scope of the invention as hereinafter claimed.

What is claimed is:

1. A mass flowmeter adapted to measure the mass flow rate of liquid passing therethrough comprising:
   a main conduit,
   two branch conduits interconnected to said main conduit intermediate the ends thereof,
   four flow restrictors, two of said flow restrictors positioned in each of said branch conduits,
   means for pumping a constant volumetric flow from a point in one of said branch conduits intermediate the said two flow restrictors to a point in the other of said branch conduits intermediate the two said flow restrictors, said constant volumetric flow being larger than the flow rate being measured,
   and means to allow the measurement of the differential pressure between the upstream and downstream sections of said main conduit.

2. A mass flowmeter adapted to measure the mass flow rate of fluid flowing therethrough between its input and output ends independently of changes in the density of such fluid comprising: separate first and second branch conduits connected between said input and output ends for providing a path of flow for said fluid from said input t said output end, a first and second flow restrictor disposed in said first conduit along the path of flow therethrough, a third and fourth flow restrictor disposed in said second conduit along the path of flow therethrough, means for pumping fluid at a constant volumetric flow rate which is greater than the flow rate of said fluid flowing through said flowmeter from said first conduit at a location intermediate said first and second flow restrictors into said second conduit at a location intermediate said third and fourth flow restrictors, means for measuring the differential pressure between said input and output ends where the differential pressure varies linearly and proportionally with the mass flow rate of fluid flowing through the flowmeter and independently of said fluid density changes.

3. A mass flowmeter adapted to measure the mass flow rate of an effectively incompressible fluid passing therethrough comprising:
   a conduit,
   a means for dividing the fluid flow in said conduit into two parts,
   two pairs of flow restrictors, a respective pair of said flow restrictors positioned in each of said conduit parts in spaced apart relationship along the path of flow of fluid therein,
   means for pumping fluid flowing in one of said parts from a location intermediate one pair of flow restrictors into the other of said parts at a location intermediate the other pair of said flow restrictors at a given constant volumetric flow rate, and
   means responsive to the differential pressure across two of said flow restrictors for producing a signal proportional to the product of the density of said fluid, the volumetric flow rate of the fluid passing through said flowmeter and said given constant volumetric flow rate.

4. A mass flowmeter adapted to measure the mass flow rate of liquid passing therethrough comprising:
   a main conduit,
   a pair of branched conduits interconnected to said main conduit intermediate the ends thereof,
   two pairs of flow restrictors, a respective pair of said flow restrictors positioned in each of said branched conduits in spaced apart relationship along the path of flow of liquid therein,
   means for pumping liquid at a constant volumetric flow rate independent of changes in density of said liquid from one of said branched conduits at a location intermediate one pair of flow restrictors into the other of said branched conduits at a location intermediate the other pair of flow restrictors, said volumetric flow rate being larger than the flow rate being measured, and
   means to measure the differential pressure across two of said flow restrictors where the differential pressure varies linearly with changes in the mass flow rate being measured.

5. A mass flowmeter adapted to measure the mass flow rate of an effectively incompressible fluid passing therethrough wherein said fluid undergo changes in density comprising:
   a main conduit,
   a pair of branched conduits interconnected to said main conduit intermediate the ends thereof,
   two pairs of flow restrictors, a respective pair of said flow restrictors positioned in each of said branched conduits in spaced apart relationship along the path of flow of fluid therein,
   means for pumping fluid at a constant volumetric flow rate less than the flow rate of the fluid to be measured from one of said branched conduits at a location intermediate one pair of flow restrictors into the other of said branched conduits at a location intermediate the other pair of flow restrictors, and
   means to provide a signal proportional to the product of the density and volumetric flow rate of fluid passing through said flowmeter and the pumped constant volumetric flow rate comprising means for measuring the differential pressure between a location in one branch conduit intermediate one pair of flow restrictors and a location in the other branch conduit intermediate the other pair of flow restrictors.

6. In combination, a source of liquid, utilization means for utilizing liquid from said source, means for transferring liquid from said source to said utilization means comprising a mass flowmeter, said meter having an input end connected to said source and an output end connected to said utilization means, said mass flowmeter comprising separate first and second branched conduits connected between said input and output ends for providing a path of flow for said liquid from said input to said output ends, a first and second flow restrictor disposed in said first conduit along the path of flow therethrough, a third and fourth flow restrictor disposed in said second conduit along the path of flow therethrough, means for pumping liquid at a constant volumetric flow rate from said first conduit at a location intermediate said first and second flow restrictors into said second conduit at a location intermediate said third and fourth flow restrictors, and means for providing a resultant signal which varies linearly with changes in the mass flow rate of liquid being transferred from said source to said utilization means comprising means responsive to a first signal which varies with the density of liquid being transferred and the pressure drop through one of said flow restrictors and a second signal which varies with the density of liquid being transferred and the pressure drop through another one of said flow restrictors, said last named one and another restrictor being selected such that said resultant signal changes linearly with changes in the mass flow rate.

7. A mass flowmeter adapted to measure the mass flow rate of liquid passing therethrough wherein said liquid undergoes changes in density by providing a differential pressure signal which varies linearly with changes in said mass flow rate comprising:
 a main conduit,
 two branched conduits interconnected to said main conduit intermediate the ends thereof,
 four flow restrictors,
 two of said flow restrictors positioned in each of said branched conduits,
 means for pumping a constant volumetric flow at a rate less than the flow rate of liquid to be measured and independent of changes in density of said liquid from a point in one of said branched conduits intermediate said two flow restrictors to a point in the other of said branched conduits intermediate the other said two flow restrictors, and
 means for measuring the differential pressure between the points in said branched conduits intermediate said flow restrictors.

8. A mass flowmeter adapted to measure the mass flow rate of fluid passing therethrough comprising:
 a main conduit,
 two branched conduits interconnected to said main conduit intermediate the ends thereof,
 four flow restrictors,
 two of said flow restrictors positioned in each of said branched conduits,
 means operating independently of changes in density of said fluid for pumping a constant volumetric flow rate from a point in one of said branched conduits intermediate to said two flow restrictors to a point in the other of said branched conduits intermediate the other said two flow restrictors, and
 means for measuring the differential pressure between the upstream and downstream section of said main conduit.

9. A mass flowmeter adapted to measure the mass flow rate of liquid flowing therethrough independently of changes in the density of said liquid comprising:
 first means for dividing the liquid flowing therethrough into separated, flowing, first and second parts,
 second means for recombining the liquid flowing in said first and second parts into a common flowing part,
 said first part comprising a first and second flow restrictor in spaced apart relationship,
 said second part comprising a third and fourth flow restrictor in spaced apart relationship,
 each of said flow restrictors having substantially equal flow restrictor coefficients and flow areas,
 means operating independently of changes in density of liquid flowing through said first and second parts for pumping liquid at a constant volumetric flow rate from said first part at a location intermediate said first and second flow restrictors into said second part at a location intermediate said third and fourth flow restrictors, and
 means for providing a linear indication of changes in said mass flow rate of liquid comprising means for measuring the differential pressure across two of said flow restrictors where the differential pressure varies linearly with the mass flow rate of liquid flowing through the flowmeter.

10. In combination,
 a source of liquid,
 utilization means for utilizing liquid from said source,
 means for transferring liquid from said source to said utilization means,
 said transferring means having an input end connected to said source and an output end connected to said utilization means,
 said transferring means comprising separate first and second branched conduits connected between said input and output ends for providing a path of flow for said liquid from said input to said output ends,
 a first and second flow restrictor disposed in said first conduit along the path of flow therethrough,
 a third and fourth flow restrictor disposed in said second conduit along the path of flow therethrough,
 means operating independently of changes in density of liquid flowing through said transferring means for pumping liquid at a constant volumetric flow rate from said first conduit at a location intermediate said first and second flow restrictors into said second conduit at a location intermediate said third and fourth flow restrictors, and
 means for providing an indication which varies linearly with changes in the mass flow rate of liquid flowing through said transferring means comprising a differential pressure indicator for measuring the differential pressure across the two of said flow restrictors where the differential pressure varies linearly with changes in the mass flow rate of liquid flowing through said transferring means.

References Cited by the Examiner
UNITED STATES PATENTS

| | | | |
|---|---|---|---|
| 1,518,279 | 12/1924 | Smoot | 73—205 |
| 1,559,155 | 10/1925 | Bullock | 73—211 |
| 2,570,410 | 10/1951 | Vetter | 73—205 X |
| 2,838,927 | 6/1958 | Gray | 73—30 |

FOREIGN PATENTS

| | | |
|---|---|---|
| 1,265,604 | 5/1961 | France. |

RICHARD C. QUEISSER, *Primary Examiner.*
DAVID SCHONBERG, E. D. GILHOOLY,
*Assistant Examiners.*